United States Patent
Fraser

[11] 3,726,340
[45] Apr. 10, 1973

[54] APPARATUS FOR OVERCOMING LOST CIRCULATION IN OIL WELLS

[76] Inventor: Ward M. Fraser, P.O. Box 101, Harbor City, Calif.

[22] Filed: Sept. 3, 1971

[21] Appl. No.: 177,669

[52] U.S. Cl. .................166/117, 166/295, 175/72
[51] Int. Cl. .............................................E21b 33/13
[58] Field of Search...............166/295, 285, 286, 166/292–294, 300, 104, 69, 117, 162, 164, 165, 177, 241; 175/72

[56] References Cited

UNITED STATES PATENTS

| | | | |
|---|---|---|---|
| 3,379,253 | 4/1968 | Chism | 166/295 |
| 2,609,880 | 9/1952 | Dyer | 166/117 |
| 2,366,373 | 1/1945 | Vorhees | 166/117 X |
| 3,637,019 | 1/1972 | Lee | 166/295 |
| 2,889,883 | 6/1959 | Santora | 166/295 |
| 2,867,278 | 1/1959 | Mallory et al. | 166/295 |
| 3,126,959 | 3/1964 | Ortloff | 166/295 X |

Primary Examiner—Stephen J. Novosad
Attorney—Pastoriza & Kelly

[57] ABSTRACT

Oil well side walls are rendered substantially impervious to fluid at a level at which lost circulation is occuring by lowering to this level a capsule containing ingredients for generating a polyurethane foam. These ingredients are mixed while the capsule is at a desired level in the oil well bore hole, the resulting generation of foam completely fracturing the capsule and effectively plugging the side walls of the oil well.

1 Claim, 3 Drawing Figures

APPARATUS FOR OVERCOMING LOST CIRCULATION IN OIL WELLS

This invention relates to a method and apparatus for overcoming lost circulation in oil wells by the use of a polyurethane foam.

BACKGROUND OF THE INVENTION

In normal oil well drilling operations, a drilling fluid or mud, as it is commonly termed, is circulated down through the drill pipe string to exit adjacent to the drilling bit and then pass up through the annulus defined between the drill pipe string and oil well side walls. Circulation of this drilling fluid keeps the drill bit properly lubricated and serves to being up chips and other debris to the surface during the drilling operation.

Often times a condition occurs known as "lost circulation." At some level during the drilling operation, the side walls become porous or include openings such that the drilling fluid instead of circulating back up the oil well passes out through the side walls and is "lost." The loss of the circulation can be serious in that the drill will no longer be properly lubricated and the bit thus wears out much sooner than would ordinarily occur. In addition, the bit itself is more vulnerable to breakage and in situations where complete or even partial circulation is lost, it is necessary to pull the drill string pipes from the hole to replace worn or damaged parts.

Needless to say, the foregoing operations are very time consuming and costly to the oil well operator.

BRIEF DESCRIPTION OF THE PRESENT INVENTION

The present invention has as its primary object the provision of a novel method and apparatus for overcoming lost circulation problems such as described heretofore. More particularly, the invention contemplates the generation of a polyurethane foam at the level in the oil well at which it is suspected that lost circulation is occuring. The polyurethane foam expands rapidly during its generation and becomes very rigid. This expansion results in the foam filling cracks and crevices and other fissures or openings through which the lost circulation may be occuring in the side wall. After setting, the drilling may continue by simply drilling through the plug of rigid plastic resulting from the polyurethane foam and drilling may continue without further loss of mud circulation.

The method of the invention thus includes the steps of providing a resin and a catalyst in separate containing means, the resin and catalyst generating a polyurethane foam upon mixing. The containing means is lowered in the oil well to that level at which lost circulation occurs and the containing means then fractured so that the resin and catalyst, which may comprise toluene di-isocyanate may mix together and generate the polyurethane foam. The expanding foam thus renders the side walls substantially impervious to fluids.

A preferred apparatus for carrying out the method comprises a capsule means defining at least two chambers separated by a frangible barrier wall. These chambers contain respectively a resin and catalyst ingredient which upon mixing will generate the desired polyurethane foam. A power unit means is coupled to the capsule means such that operation of the power unit means fractures the barrier wall and mixes the foam generating ingredients in the chambers together. Means are then provided for lowering the power unit means and capsule means into the oil well to the level at which lost circulation is taking place, subsequent operation of the power unit means then fracturing the barrier wall and mixing the ingredients to generate the foam.

BRIEF DESCRIPTION OF THE DRAWINGS

A better understanding of the method and apparatus of the invention will be had by referring to the accompanying drawings, in which.

DETAILED DESCRIPTION OF THE INVENTION

Figure 1:
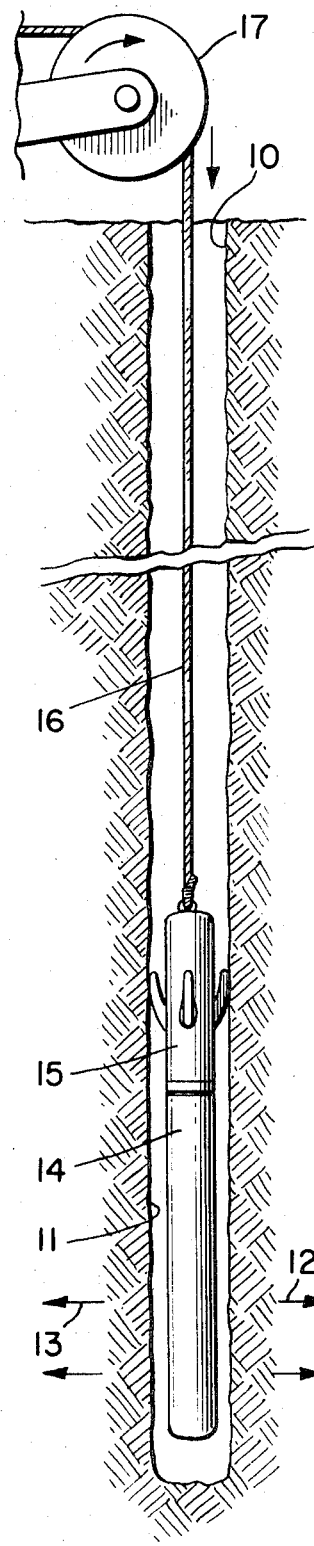
FIG. 1 is a cross-section of an oil well bore hole showing in full lines a capsule and power unit adapted to be lowered into the well for overcoming lost circulation problems.

Referring to FIG. 1 there is shown an oil well 10 having side wall portions 11 at a given depth at which lost circulation of drilling fluid has occured. The egress of the drilling fluid at this level is indicated by the arrows 12 and 13.

In accord with the present invention, an elongated capsule 14 coupled to a power unit 15 is lowered into the oil well 10 as by a cable 16 connecting to suitable lowering and raising means 17 at the surface of the bore hole.

Figure 2:
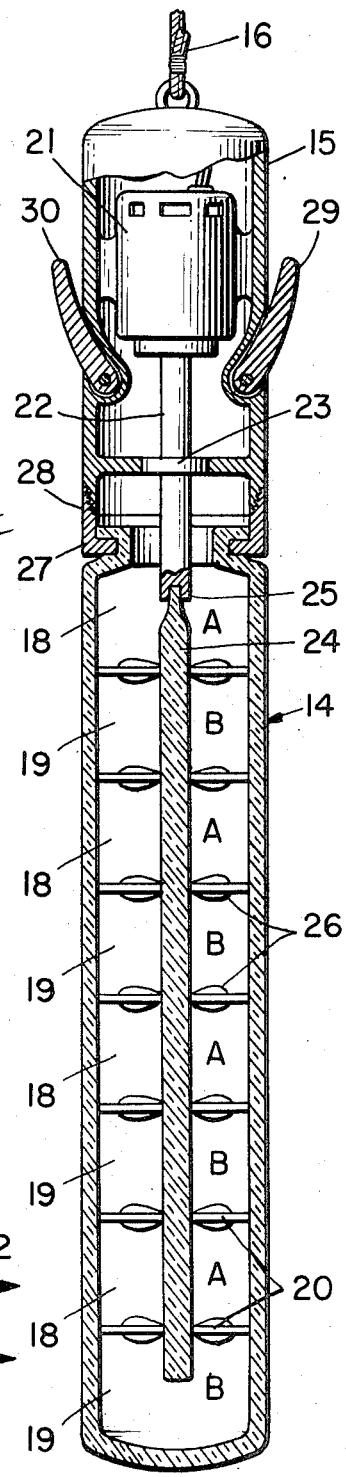
FIG. 2 is an enlarged cross-section of the capsule and power unit of FIG. 1.

Referring to FIG. 2, details of the elongated capsule 14 will be described. As shown, the capsule 14 is preferably formed of a low strength frangible plastic material and defines a vertical series of compartments every other one of which is indicated by the numeral 18 and the compartments in between designated by the numeral 19. These compartments are separated by horizontal barrier walls such as indicated at 20 in the lower portion of FIG. 2.

Polyurethane foam generating ingredients in the form of a resin and catalyst fill the compartments 18 and 19 respectively. As is well known to those skilled in foam art these ingredients must be maintained separate until such time as it is desired to generate the foam. Further, the proportions of the two ingredients must be carefully controlled and towards this end, the compartments are properly sized for the particular component to be received in the compartment. Thus, the resin compartment 18 would contain resin material designated by the letter A and the catalyst compartments or chambers 19 would be filled with a suitable catalyst such as toluene diisocyanate designated by the letter B.

Referring now to the power unit portion 15 of the apparatus, it will be noted that this unit includes a motor 21 having a motor shaft 22 passing through a stabilizing bearing 23. The end of the motor shaft is arranged to be keyed to a plastic extension shaft 24 as at 25. The extension shaft 24 includes a series of blades or propellor like lateral protuberances 26. As shown, these blades or protuberances actually extend midway in the horizontal barrier walls between adjacent chambers, the arrangement being such that operation of the motor 21 to rotate the shaft will cause these blades to fracture the barriers 20 separating the chambers.

The connection of the elongated capsule 14 to the power unit 15 is accomplished by coupling means in the form of a collar 27 threaded at 28 to the lower end of the power unit 15. This collar 27 may be expendable along with the capsule.

The power unit 15 itself may include engaging means in the form of pivoted levers 29 and 30 which will engage the side walls of the bore hole when downward movement of the unit ceases. These engaging members 29 and 30 prevent rotation of the power unit and the capsule connected thereto when the motor 21 is initially operated.

Figure 3:
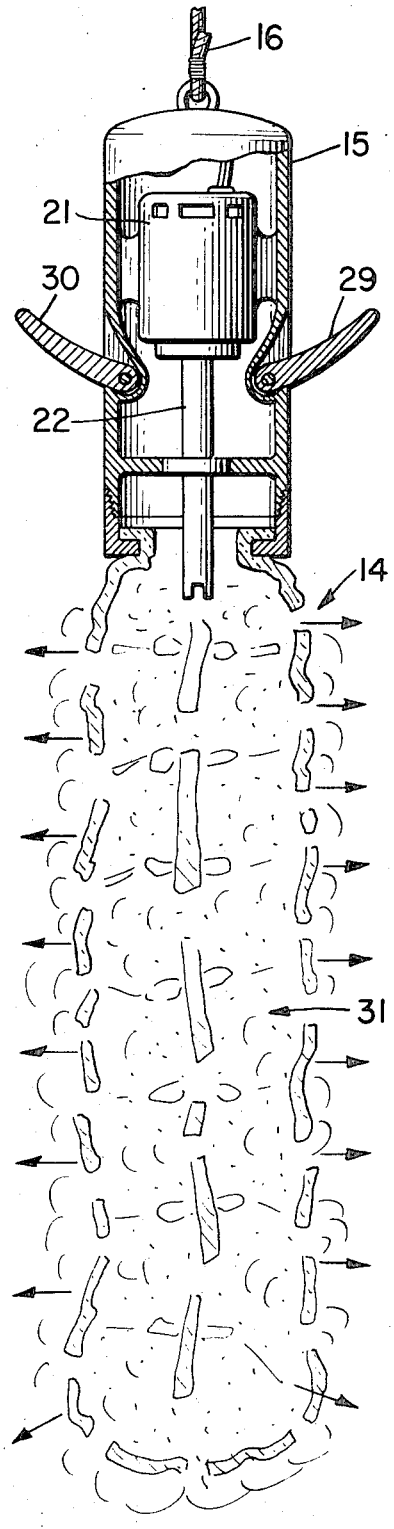
FIG. 3 is a view similar to FIG. 2 showing the manner in which polyurethane foam in generated in accord with the invention.

FIG. 3 illustrates the complete disintegration of the capsule as a consequence of operation of the motor 21, the engaging means 29 and 30 being shown in expanded position for preventing rotation of the power unit when the motor is operated. Generated foam is shown at 31.

OPERATION

In operation, assume that a condition of lost circulation occurs during drilling of the oil well 10 of FIG. 1. Partial or complete loss of circulation will be evident immediately from a lowering of the drilling fluid or mud level in the usual mud trough. The depth of the drilling at this time is noted and the drill pipe string is withdrawn along with the drill bit.

The elongated capsule and power unit of FIG. 1 is then lowered into the bore hole by the cable 16 to the level at which the lost circulation occured. The engaging means in the form of the levers 29 and 30 will simply slide along the side walls of the bore hole until the apparatus is stopped at the desired level. A slight upward pull on the cable 16 will lock the engaging levers 29 and 30 into the side walls sufficient to hold the power unit 15 against rotation.

The motor 21 may then be energized by suitable leads passing down through the line 16 to the motor from the surface of the bore hole. Energization of the motor 21 rotates the shaft 22 and extension shaft 24 causing the blades 26 to fracture the horizontal barriers 20 between the various chambers. Fracturing of the barriers will permit the ingredients A and B to mix together and continual rotation of the extension shaft 24 effects a thorough mixing. The reaction between the resin and catalyst in the various chambers will result in the generation of polyurethane foam.

The expanding foam will eventually shatter the entire capsule as depicted in FIG. 3 and as the generation of the foam continues, the foam itself will fill any crevices or openings in the oil well side walls thereby rendering them substantially impervious to fluid.

The foam itself will eventually set; that is, it becomes rigid. Since the capsule and extension shaft portion of the apparatus is frangible, it is permanently lost in the foam mix. On the other hand, the power unit 15 may readily be retrieved by simply raising up on the cable 16. In this respect, the engaging arms 29 and 30 may be pivoted by suitable shear pins which will simply break off and new arms may be provided when the power unit 15 is brought to the surface. Alternatively, a retracting mechanism (not shown) may be provided in the power unit 15.

After the foam has completely set, the drill pipe string may be lowered and it is a simply matter for the drill bit to drill through the rigid foam material. Drilling may thus continue, any lost circulation no longer occuring because of the plugging of the egress openings in the side walls by the foam itself.

The power unit 15 may be reused by simply securing another capsule suitably provided with the extension shaft and a substitute collar corresponding to the collar 27 which can then be threaded onto the power unit at 28, the old collar being removed.

From the foregoing description, it will be evident that the present invention has provided a greatly improved method and apparatus for overcoming problems of lost circulation. While only a specific embodiment has been described, it will be evident that various changes and modifications can be effected in the equipment itself without departing from the scope and spirit of the invention.

What is claimed is:
1. An apparatus for overcoming lost circulation in an oil well comprising, in combination:
   a. an elongated capsule defining a vertical series of compartments separated by horizontal barrier walls, said entire capsule being comprised of low strength frangible plastic material;
   b. a power unit including motor means;
   c. coupling means for connecting said motor means to the upper end of said capsule;
   d. mixing means in said capsule passing through said barrier walls and coupled to said motor means so that operation of said motor means causes said mixing means to fracture said barrier walls and mix ingredients in adjacent ones of said compartments with each other; and
   e. engaging means on said power unit for engaging the side walls of said oil well to hold said power unit and capsule from rotating upon operation of said motor means, every other compartment in said series being filled with a resin and the compartments in between being filled with a catalyst whereby said capsule and power unit may be lowered in said oil well to a given level at which circulation is lost, said engaging means holding said power unit against rotation at said level, and said motor means operated to thereby fracture said barriers and mix said resin and catalyst to generate a polyurethane foam which expands and fractures the entire capsule, said foam rendering the side walls of the wall at said level substantially impervious to fluid, said power unit itself then being retrievable for receiving another capsule after being withdrawn from said well for a subsequent operation.

* * * * *